Patented Oct. 23, 1934

1,978,318

UNITED STATES PATENT OFFICE 1,978,318

ARC WELDING FLUX

Virdis Miller, Schenectady, N. Y., assignor to General Electric Company, a corporation of New York No Drawing. Original application September 1, 1932, Serial No. 631,351. Divided and this application July 7, 1933, Serial No. 679,336

4 Claims. (Cl. 148—26)

My invention relates to arc welding fluxes.

In my application, Serial No. 631,351 for Arc welding filed September 1, 1932, I have described and claimed a method of welding which is performed by traversing the arcing terminal of an electrode through the central portion of a layer of flux which is applied to the work prior to the welding operation and which restricts the action of the arc both laterally and in the direction of welding during the welding operation. The present application is a division of my aforesaid application, Serial No. 631,351, filed September 1, 1932.

A welding flux of the following composition by weight is particularly suited for performing this welding operation:—

| | Per cent |
|---|---|
| Bentonite clay | 1 |
| Sodium hydroxide | 4 |
| Sodium carbonate | 2 |
| Titanium dioxide | 18 |
| Feldspar | 53 |
| Water | 22 |

The above percentages may be varied considerably without departing from my invention, and I give below the limits of variation permissible in a flux of the above composition:—

| | Per cent |
|---|---|
| Bentonite clay | 0 to 5 |
| Sodium hydroxide | 1 to 10 |
| Sodium carbonate | 1 to 5 |
| Titanium dioxide | 10 to 40 |
| Feldspar | 25 to 74 |
| Water | 12 to 40 |

The base of this flux is feldspar which in the presence of titanium dioxide becomes viscous causing the flux to remain where it collects over the molten metal. In the presence of titanium dioxide, it has no tendency to run down under the arc and stop the welding operation. I prefer to use a potassium feldspar, but other forms of feldspar may be used without departing from my invention. Sodium hydroxide forms with the titanium dioxide in the flux a titanate which has a beneficial fluxing action on the arc. The sodium hydroxide also acts to lower the melting point of the vitreous material in the flux causing it to form over the metal directly behind the arc. Any other alkali hydroxide having a melting point substantially the same as that of sodium hydroxide may be used. For example, potassium hydroxide is a suitable material. The chemical reaction between the titanium dioxide and the alkali hydroxide is rather sluggish but during the reaction enough water is given off to fill the molten slag with steam. This causes it to be very porous and very light, and the presence of the flux on the molten metal does not form depressions in the weld when enough of this material is used to form a satisfactory coating. The sodium carbonate has a fluxing effect on the molten metal. The bentonite clay above referred to is a hydrated aluminum silicate which forms a viscous solution or suspension with water. It has a colloidal property and is sometimes referred to as colloidal clay. This material holds the water in the flux long enough to prevent its being melted until the arc is quite near to it. This makes the flux melt at the proper time and prevents the arc from shifting out of the pool. By reason of its presence the flux is used at the proper time and the resultant weld metal is cleaned more effectively. There are several forms of bentonite, but I prefer to use a material sold by the American Colloid Company of Chicago, Ill., under the trade name "Volclay". This material has the following average analysis:—

| | |
|---|---|
| $SiO$ | 61.78 |
| $Fe_2O_3$ | 3.10 |
| $FeO$ | 0.28 |
| $MnO$ | 0.08 |
| $Al_2O_3$ | 21.56 |
| $CaO$ | .68 |
| $MgO$ | 2.62 |
| $K_2O$ | .31 |
| $Na_2O$ | 2.22 |
| $SO_3$ | Trace |
| Moisture at 110° C | 2.98 |
| Ignition loss | 4.73 |
| Specific gravity | 2.7 |
| Fusion point | 2462–2552° C. |

It absorbs 4 to 5 times its weight of water and swells 12 or 15 times its dry bulk. When saturated it forms a gelatinous mass. In 30 parts of water 85 per cent remains in permanent suspension.

The solid materials employed in the above flux are preferably in a finely divided state and form a paste when mixed with the water specified. The material should be thoroughly mixed to provide a flux of uniform texture.

When welding in accordance with the method disclosed and claimed in my above-identified application this fluxing material is applied to the work as a coating at least an eighth of an inch in thickness and of sufficient width to leave on each side of the weld a retaining wall of unfused flux for that portion of the flux which is fused by the action of the welding arc as the arcing terminal of an electrode is traversed through the central portion of this flux coating. The arc is restricted by the presence of the flux and its force and heat are directed downwardly to cut away the metal of the part being welded, force it backward, and mix it with the molten metal in the pool of weld metal formed during welding thus causing the entire pool to have nearly the same temperature. This temperature is not very much greater than the melting point of the metal and consequently the metal does not boil and have upon cooling a large crystalline grain structure. By reason of the flux the arc has a long flame which is forced to play along the surface of the pool and cause it to remain liquid long enough to allow gases and impurities in the molten metal to rise to its surface and escape. The resulting arc flame also has an annealing action upon the weld. During welding the surface of the pool is covered by that portion of the flux coating melted by the arc.

Alloying materials may be added to the above-identified flux material without departing from my invention, but I prefer to apply alloying material to the weld in the form of a filler strip located at or in the seam to be welded since when the alloying material is supplied in the fluxing material it collects on the tip of the electrode attacking it and causing the action of the arc to become erratic thus producing poor welds.

Although the above specified welding flux is particularly suited for welding in accordance with the method claimed and described in my above-identified application, it is to be understood that its use is not limited to this particular method of welding.

What I claim as new and desire to secure by Letters Patent of the United States, is:

1. A welding flux having substantially the following composition by weight:—hydrated aluminum silicate which forms a viscous solution with water, up to 5 per cent; an alkali hydroxide fusible at substantially the same temperature as sodium hydroxide, 1 to 10 per cent; sodium carbonate 1 to 5 per cent; titanium dioxide, 10 to 40 per cent; feldspar 25 to 74 per cent; and water 12 to 40 per cent.

2. A welding flux having substantially the following composition by weight:—bentonite, 1 per cent; sodium hydroxide, 4 per cent; sodium carbonate, 2 per cent; titanium dioxide, 18 per cent; feldspar, 53 per cent; and water, 22 per cent.

3. A welding flux adapted to be used as a paste with water, said flux containing bentonite clay which in the presence of the water of said paste retards the melting rate of said flux during welding.

4. A welding flux containing bentonite clay in percentages up to 5 per cent of the weight of the flux.

VIRDIS MILLER.